United States Patent Office 2,940,923
Patented June 14, 1960

2,940,923

TREATMENT OF HYDROCARBONS

Leo Garwin, Oklahoma City, Okla., assignor to Kerr-McGee Oil Industries, Inc., a corporation of Delaware No Drawing. Filed Oct. 21, 1955, Ser. No. 542,087

11 Claims. (Cl. 208—118)

This invention relates to a process for improving catalytic hydrocarbon cracking processes. More particularly the present invention is concerned with counteracting or neutralizing the harmful effects of metallic type contaminants deposited on a catalyst during a catalytic cracking operation.

It is well known in the art of catalytic cracking that the catalyst must be replaced with new catalyst at frequent intervals or continuously in order to maintain the desired controlled cracking ability of the catalyst, as may be indicated by high yields of the desired gasoline fraction and low yields of light gases. Metallic contaminants present in the feed to the catalytic cracker foul the catalyst and operate as catalyst poisons. This results in a loss of controlled catalytic cracking ability accompanied by reduced gasoline selectivity as indicated by lower yields of the desired gasoline fraction and greatly increased yields of light gases.

Considerable effort and money has been expended in an effort to alleviate the harmful effect of these metallic contaminants. One of the more satisfactory methods acid leaches the poisons from the catalyst. Another applies a siliceous coating on the contaminated catalyst surface by the use of fluosilicic acid and thereby rejuvenates the catalyst. All of the known processes including the above have certain disadvantages. For example, the first type referred to requires auxiliary leach or treating equipment and a drying step. The second one referred to uses a considerable amount of auxiliary equipment for the coating operation which occurs outside of the cracking zone and requires careful control of the temperature of the coating operation in order to assure proper filming of the metallic poisons.

In accordance with the present invention, the harmful effects of metallic type contamination of siliceous catalysts employed in catalytic hydrocarbon cracking processes may be counteracted or neutralized by the in situ deposition on the catalyst surface of a film of silica or silica-containing synthetic catalyst. This deposition may occur in the cracking zone and during the cracking operation and thereby eliminates the difficulties present in prior art processes which deposit siliceous films on the catalyst surface during the catalyst residence outside of the cracking zone.

For the purpose of depositing a siliceous film on the surface of the catalyst while in the cracking zone and during the cracking operation, the present invention preferably employs an organophilic siliceous material or an inorganic siliceous material which is brought into contact with the catalyst during the catalyst cycle.

Organophilic siliceous materials are exemplified by the quaternary organic amine modified clays known as "Bentones," the esters formed when an alcohol reacts with the acidic centers of silica and known as Estersils," the silicones, and silicanes. Particular examples of the "Bentones" and "Estersils" are described in U.S. Patents 2,033,856, 2,531,396, 2,657,149, 2,676,148, and 2,697,699.

Suitable inorganic silicas useful in this invention are the more volatile silica compounds such as the silicon halides e.g., silicon tetrachloride. In general, the inorganic silicas have the one disadvantage of forming extremely corrosive acids upon decomposition and therefore it may be stated that organophilic siliceous materials are generally preferred.

For the purpose of introducing the silica film former into the cracking zone via the catalytic cracker feed stock, it may be dispersed in a suitable vehicle such as kerosene, gas oil or water and the dispersion mixed with catalytic cracker feed stock in the desired amount. Alternatively, the film former may be dispersed in desired amounts directly to catalytic cracker feed stock, or directly to the reactor or regenerator sections of the catalytic cracker. On introduction of the catalytic cracker feed stock into the cracking zone, the silica film former is entrained or carried by the feed stock. As an example of the foregoing, a silicone is dispersed in gas oil, employing from 5–50% by weight of silicone, specifically 25% by weight thereof. This dispersion is mixed with the catalytic cracker feed stock in an amount, for example, between 0.0001–0.001% by weight, specifically about 0.0005%. During the residence of the feed in the cracking zone or reactor, the silicone is decomposed and forms a film of silica on the catalyst surface which counteracts or neutralizes the harmful effects of the metallic contaminants. This film may be either of the type which adheres to the catalyst surface for an extended period of time or permanently, or of the type which readily chips off the catalyst surface carrying the metallic contaminants with it.

As a further example, silicone may be injected into the catalyst line as either a liquid or aerosol type vapor dispersion, thus allowing the silicone to pass through both the cracking and regenerating sections during the catalyst cycle.

The degree of treatment required to obtain a workable silica film is a function of a number of factors, one of the more important being the potential catalyst poisoning level of the feed stock. It may, however, be stated that an amount of silica-containing material yielding a film of from 0.00001 weight percent up to 1 weight percent, or the upper limit of economic feasibility, is suitable. The upper limit as determined by economics is a factor derived from the catalyst cost, the rate at which catalyst make-up is required, and the catalyst poisoning potential of the feed.

A modification of the present invention deposits a synthetic catalyst film on the surface of the catalyst, the constituents of the film being substantially the same as those of the catalyst and in the same weight ratios. For example, when employing a silica-alumina type catalyst containing approximately 12–15% alumina, a mixture of silicone and an organic aluminum soap fed with either the catalytic cracker feed, the catalyst feed, the steam feed, or the air feed to the regeneration zone will deposit a film on the surface of the catalyst containing silica and alumina. This film will be in the nature of a synthetic catalyst containing from about 12–15% alumina when the ratio by weight of silicone to organic aluminum soap is properly adjusted.

The present invention is useful in those catalytic hydrocarbon cracking processes employing a solid acidic type cracking catalyst which is susceptible to metallic type contamination during use, and it is to be understood the invention is not limited to siliceous catalysts or the silica-alumina catalyst hereinbefore specifically described for the purpose of illustration only. Examples of solid acidic type cracking catalysts, in addition to the foregoing examples, include the double metal oxide catalysts such as silica-alumina, alumina-thoria, silica-thoria, thoria-alumina and those naturally occurring clays such as the Bentonites and Attapulgites. Other catalysts contain substances such as magnesia, chromia, boria, zornica and small amounts of cobalt molybdate or similar compounds.

Elements other than aluminum or silicon may be present in the film former, depeending upon the elements present in the specific catalyst, and deposited in film form upon the catalyst. The composition of a film former useful in treating any specific catalyst of the solid acidic type may be compounded to yield a film upon decomposition which is essentially the composition of the catalyst, as above described for silica-alumina type catalysts.

The foregoing description of the present invention is for the purpose of illustration only and is not limiting to the scope thereof which is set forth in the claims.

I claim:

1. In a catalytic hydrocarbon cracking process of the type wherein a siliceous catalyst is contaminated in the cracking zone with metallic type contaminants resulting in reduced gasoline selectivity, the improvement comprising depositing a film comprising silica on the catalyst while in the cracking zone and during the cracking operation, the amount of film deposited being about 0.00001–1 weight percent based upon the weight of the catalyst in the cracking zone.

2. The improvement of claim 1 wherein the deposition is brought about by the decomposition of an organophilic siliceous material.

3. The improvement of claim 1 wherein the deposition is brought about by the decomposition of an inorganic siliceous material.

4. In a catalytic hydrocarbon cracking process of the type wherein a silica-alumina catalyst is contaminated in the cracking zone with metallic type contaminants resulting in reduced controlled catalytic cracking ability, the improvement comprising depositing a film containing silica and alumina on the catalyst while in the cracking zone and during the cracking operation, the ratio by weight of the silica to alumina deposited being substantially the same as the silica to alumina weight ratio existing in the catalyst and the amount of film deposited being about 0.00001–1 weight percent based upon the weight of the catalyst in the cracking zone.

5. In a catalytic hydrocarbon cracking process of the type wherein a silica-alumina catalyst is contaminated in the cracking zone with metallic type contaminants resulting in reduced controlled catalytic cracking ability, the improvement comprising depositing a film containing silica and alumina on the catalyst while in the cracking zone and during the cracking operation, the amount of film deposited being about 0.00001–1 weight percent based upon the weight of the catalyst in the cracking zone.

6. In a catalytic hydrocarbon cracking process of the type wherein a siliceous catalyst is contaminated in the cracking zone with metallic type contaminants resulting in reduced controlled catalytic cracking ability, the improvement comprising depositing a film comprising silica on the catalyst while in the regeneration zone and during the regeneration operation, the amount of film deposited being about 0.00001–1 weight percent based upon the weight of the catalyst in the regeneration zone.

7. The improvement of claim 6 wherein the deposition is brought about by the decomposition of an organophilic siliceous material.

8. The improvement of claim 6 wherein the deposition is brought about by the decomposition of an inorganic siliceous material.

9. In a catalytic hydrocarbon cracking process of the type wherein a solid acidic type catalyst is contaminated in the cracking zone with metallic type contaminants resulting in reduced controlled catalytic cracking ability, the improvement comprising depositing a film on the catalyst during the catalyst cycle, the film comprising at least one substance of a nature similar to at least one component of the catalyst and the substance increasing the selectivity of the catalyst substantially immediately upon deposition, the amount of film deposited being about 0.00001–1 weight percent based upon the weight of the catalyst in the catalyst cycle.

10. The improvement of claim 9, wherein the catalyst is of the double metal oxide type.

11. In a catalytic hydrocarbon cracking process of the class wherein a siliceous catalyst is contaminated in the cracking zone with metallic contaminants resulting in reduced gasoline selectivity, the improvement comprising contacting the catalyst with a dispersion of a silicon containing compound and depositing a film comprising silicon on the catalyst, the catalyst being contacted with the dispersion and the film being deposited thereon while it is in the cracking zone and during the cracking operation, the amount of film deposited on the catalyst being about 0.00001–1 weight percent based upon the weight of the catalyst in the cracking zone.

References Cited in the file of this patent

UNITED STATES PATENTS

| | | |
|---|---|---|
| 2,483,130 | Garrison | Sept. 27, 1949 |
| 2,579,123 | Pardee | Dec. 18, 1951 |
| 2,634,232 | Houdry | Apr. 7, 1953 |
| 2,681,305 | Sweetser | June 15, 1954 |
| 2,722,504 | Fleck | Nov. 1, 1955 |
| 2,850,462 | Plank | Sept. 2, 1958 |